United States Patent [19]

Reed

[11] Patent Number: 5,680,908

[45] Date of Patent: Oct. 28, 1997

[54] ELECTRIC POWERED VEHICLE

[76] Inventor: Louis Reed, 3704 Ribault Scenic Dr., Jacksonville, Fla. 32208

[21] Appl. No.: 593,663

[22] Filed: Jan. 29, 1996

[51] Int. Cl.$^6$ ........................................ B60K 1/00
[52] U.S. Cl. ...................... 180/65.3; 180/165; 180/65.6
[58] Field of Search ...................... 180/65.1, 65.3, 180/65.6, 165, 244; 290/9, 10, 11, 12, 17, 18, 19, 21; 318/153, 154, 156

[56] References Cited

U.S. PATENT DOCUMENTS

| | | | |
|---|---|---|---|
| 1,562,903 | 11/1925 | Miller | 180/65.3 |
| 3,845,835 | 11/1974 | Petit | 180/65.3 |
| 5,294,191 | 3/1994 | Giorgetti et al. | 180/165 |
| 5,415,245 | 5/1995 | Hammond | 180/165 |
| 5,465,806 | 11/1995 | Higasa et al. | 180/165 |

FOREIGN PATENT DOCUMENTS 2256649  12/1973  France ........................... 180/65.3

*Primary Examiner*—Richard M. Camby
*Attorney, Agent, or Firm*—Thomas C. Saitta

[57] ABSTRACT

An electrically powered vehicle comprising at least one electric motor connected to a drive axle, at least one generator means connected to another axle whereby the rotation of the axle powers the generator means to produce electricity, batteries to provide stored electrical energy to said motor, transmission gearing means to increase the rotational speed of the generator means beyond that of the axle, and management control means to selectively direct electrical power from the generator means to either the motor for power or the batteries for recharge, depending upon the driving conditions and requirements.

8 Claims, 2 Drawing Sheets

ELECTRIC POWERED VEHICLE

BACKGROUND OF THE INVENTION

The invention relates generally to the field of vehicles powered by electric motors relying on batteries as a stored energy source, and more particularly to such vehicles in which the electric motor is powered and the batteries are recharged by on-board generators operated by the rotation of the vehicle axles, the generator selectively recharging the batteries or supplying electricity to the electric motor depending on vehicle acceleration, speed and deceleration.

Because of the inherent problems with conventional fossil fuel powered vehicles, such as air pollution and the finite supply of petroleum, alternative power means for vehicles are desirable. The most obvious alternative source of power is electricity, but because by their very nature vehicles are not fixed in one location, a permanent connection to electrical power supply lines is impossible. An electrically powered vehicle must either utilize stored energy, i.e., energy stored in batteries, or generate its own electricity. The stored energy concept is well known, but current battery technology is not sufficiently advanced to provide batteries with enough stored energy to power a vehicle for more than a few hours before the batteries are drained and require recharging. Attempts to provide on-board recharging or electrical generation have focused on what has become known as the hybrid concept—providing an on-board generator powered by a small, fuel efficient gas or diesel powered motor. The generated electricity is used either to power the electric engine which actually powers the vehicle or to recharge the batteries. This hybrid concept, while an improvement over vehicles relying on batteries alone, is still relatively limited in range.

It is an object of this invention to provide an electric powered vehicle which overcomes the limited range problems associated with electric vehicles relying on stored energy or on hybrid power generation. It is an object to provide an electric powered vehicle which utilizes one or more generators coupled to the vehicle axles such that the rotation of the vehicle wheels at sufficient speed generates electricity which is used either to power the electric motor which moves the vehicle or is used to recharge the batteries—the batteries being used to operate vehicle functions when the vehicle is stopped and to supply power to the electric motor to accelerate the vehicle to a desired speed.

SUMMARY OF THE INVENTION

The invention is an electrically powered vehicle having wheels mounted on two or four axles, one or more electric motors to power the drive wheels, batteries to store electricity and deliver the electricity to the motor and to vehicle operating systems on demand, one or more generators coupled to one or both axles of the vehicle whereby the rotation of the axles turns the generator rotor to create electricity, electrically conductive means to deliver the generated electricity to the motor and to the batteries, and management control means to determine when generated electricity should be delivered to the motor or to the batteries and when the batteries should be used to supply power to the electric motor. A transmission gearing system is utilized which increases the revolutions of the generator rotor when axle revolutions are slower than required to generate the electricity and to provide excess electrical power necessary to accomplish simultaneous electrical demands from the motor, batteries and operating systems. The one or more generators and one or more motors may be mounted coaxially to the axles or transversely, in which case a differential assembly is provided. The vehicle may utilize any combination of generators and motors from one generator combined with one motor to four generators combined with four motors.

When the vehicle is stationary, the management control means allows stored electrical power to be drawn from the batteries and supplied to the operating systems of the vehicle. To begin driving, the management control means directs electricity from the batteries to the electric motor. As the vehicle accelerates, the axles rotate the generator rotor. A transmission steps up the revolutions such that the generator achieves sufficient rotational speed to generate electricity even when the vehicle is operating at slow speeds. As the vehicle reaches operating or cruising speed, the management control means causes the generated electricity to be supplied to the electric motor and to the operating systems while simultaneously shutting off the electric drain on the batteries. During periods of coasting or deceleration, when the electric motor does not require any power, the management control means directs some of the generated electricity to the batteries for recharging. When the batteries are fully recharged, the management control means detects this and shuts off the supply of electricity from the generator to prevent overcharging.

DETAILED DESCRIPTION OF THE INVENTION

Figure 1:
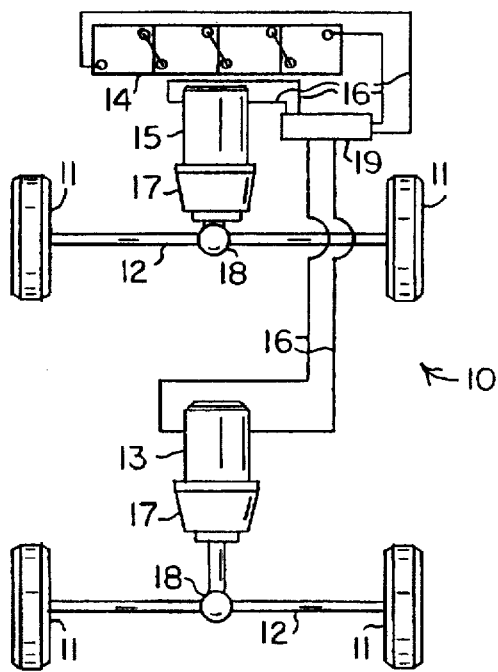
FIG. 1 is a schematic view of the invention.
Figure 2:
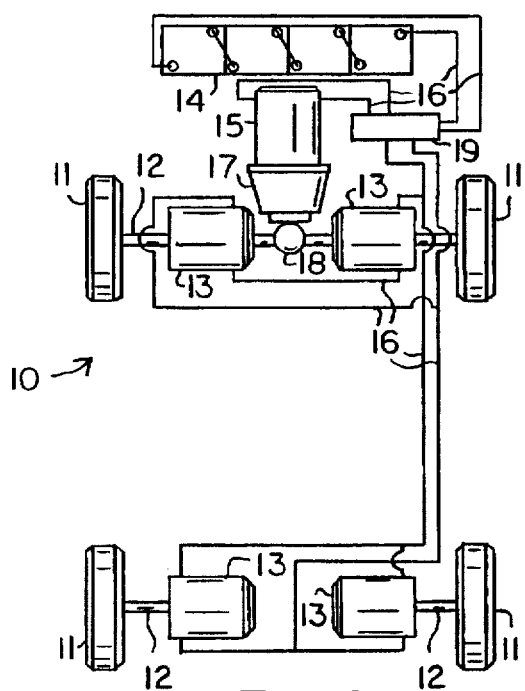
FIG. 2 is a schematic view of an alternative embodiment of the invention, showing a single generator and multiple motors.
Figure 3:
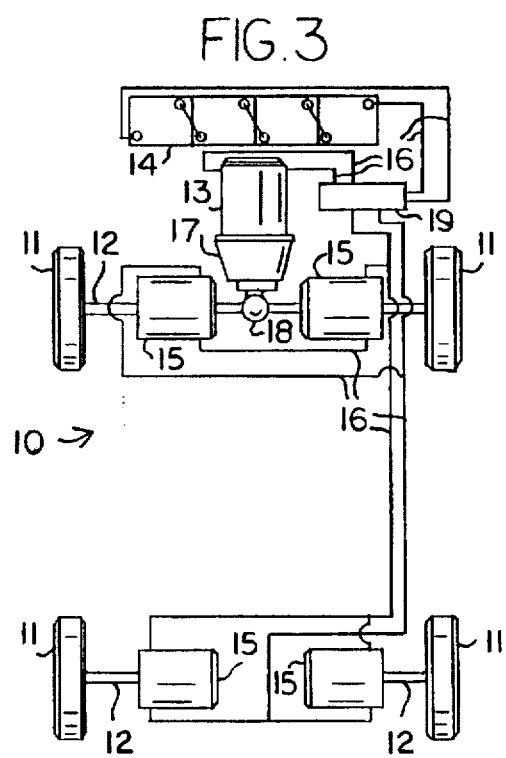
FIG. 3 is a schematic view of another embodiment showing multiple generators and a single motor.
Figure 4:
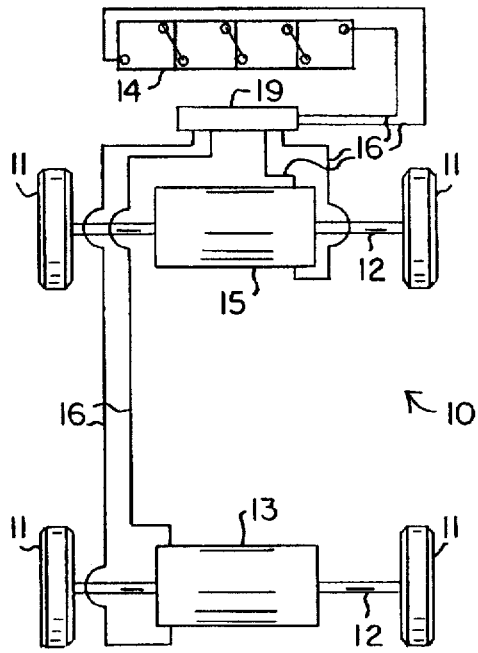
FIG. 4 is a schematic view of another embodiment showing a single generator and single motor, both mounted coaxially to the vehicle axles.
Figure 5:
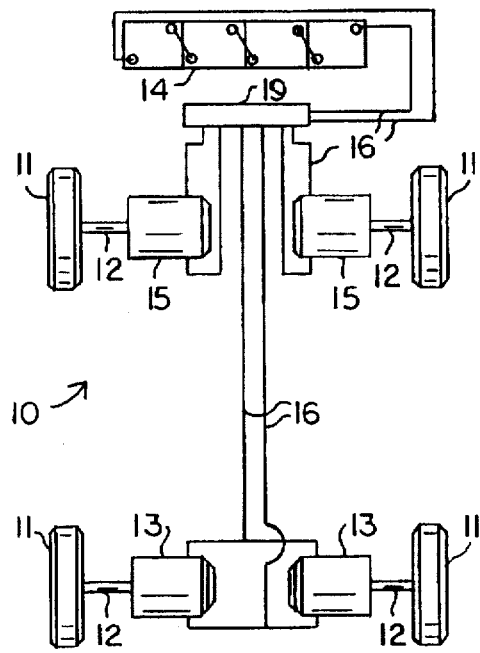
FIG. 5 is a schematic view of another embodiment showing dual generators and dual motors.
Figure 6:
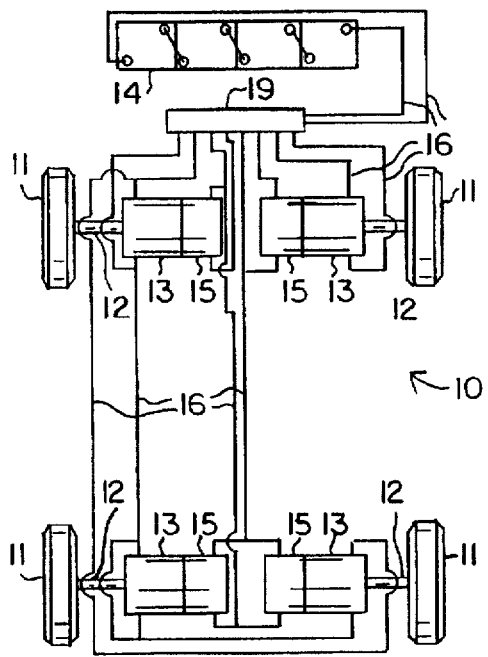
FIG. 6 is a schematic view of another embodiment showing four generators and four motors.

With reference now to the drawings, the preferred embodiment and best mode of the invention will now be described in detail. The invention comprises in general a vehicle powered by electricity, shown schematically in the drawings as vehicle 10, which as illustrated comprises four wheels 11 and either two rotating axles 12 as seen in FIGS. 1 and 4, in which case each axle 12 connects an opposing set of wheels 11, three axles 12 with one connecting a pair of wheels 11 and two independent axles each connected to a single wheel 12 as shown in FIGS. 2 and 3, or four independent axles 12 each connected to a wheel 11 as shown in FIGS. 5 and 6. The concept of the invention is equally applicable to any number of wheels 11 other than four. The vehicle 10 is powered by one or more electric motors 13, which draws its power from either a set of batteries 14 joined in series or one or more generator means 15. Electrical conductive means 16 conduct electrical current between the system components in known manner, the electric motor or motors 13, the batteries 14 and the generator means 15 being electrically coupled in various circuits.

With reference now to FIG. 1, the basic embodiment of the invention is shown to comprise two axles 12 connecting two pairs of wheels 11. The electric motor 13, of any suitable type and power known in the industry capable of producing from between 20 to 50 horsepower, is coupled by a transmission 17 and differential 18 to rotate the rear axle 12 and drive the rear set of wheels 11 in standard manner. The rotational energy of the front set of wheels 11 and front axle 12 is translated into a perpendicular direction by differential 18 to rotate the rotor of generator means 15 capable of producing from 100 to 400 amperes, creating electricity which is transported through conducting means 16 to the vehicle management control means 19. Management control means 19 is a microprocessor or other type of solid state electronics device which is capable of sensing certain vehicle conditions such as the storage level of the batteries 14, vehicle deceleration, vehicle speed, and vehicle acceleration, and then directing the electrical power from the generator means 15 through additional electrical conducting means 16 to either the batteries 14 for recharge or to the electric motor 13 for power. The batteries 14 may be of any suitable type and quantity capable of storing energy and of being recharged once that energy is discharged, including but not limited lead acid, nickel-cadmium, nickel-iron, etc. The batteries 14 are connected in series to supply the necessary voltage to meet the requirements of the particular motor 13. A second transmission gearing means 17 is coupled to the generator means 15, whereby the rotation speed of the front axle 12 can be increased when the rotational speed of the vehicle 10 is too slow to provide enough revolutions per minute to create sufficient electrical power in generator means 15 and whereby excess electrical power can be produced by the generator means 15.

When the vehicle 10 is stationary, the management control means 19 allows stored electrical power to be drawn from the batteries 14 and supplied to the essential operating systems of the vehicle 10. To begin driving, the management control means 19 directs electricity from the batteries 14 to the electric motor 13 to power the rear wheels 11. As the vehicle 10 accelerates, the front axle 12 rotates the rotor of the generator means 15. The transmission 17 steps up the revolutions such that the generator means 15 achieves sufficient rotational speed to generate electricity even when the vehicle 10 is operating at slow speeds and, more importantly, when the vehicle 10 is at cruising speeds allows the generator means 15 to create sufficient excess electricity to, sometimes simultaneously, accomplish the necessary tasks of powering the electric motor 13, recharging the batteries 14 and powering the vehicle operating systems. As the vehicle 10 reaches operating or cruising speed, the management control means 19 causes the generated electricity to be supplied to the electric motor 13 and to the operating systems while simultaneously shutting off the electric drain from the batteries 14. During periods of coasting or deceleration, when the electric motor 13 does not require any power, the management control means 19 directs some of the generated electricity to the batteries 14 for recharging. When the batteries 14 are fully recharged, the management control means 19 detects this and shuts off the supply of electricity from the generator means 15 to prevent overcharging.

FIG. 2 shows an alternative embodiment of the invention, in which four smaller motors 13 are provided, two forward motors 13 coupled to a single front axle 12 and two other motors 13 each coupled to an independent rear axle 12. As in FIG. 1, the rotational energy of the front axle 12 is translated by a differential 18 to create electricity in the generator means 15. The operation of the vehicle 10 is as described above. FIG. 3 illustrates an embodiment in which a single motor 13 powers the front axle 12, while four generator means 15 are provided, two coupled to the single front axle 12 and two coupled to independent rear axles 12. FIG. 4 illustrates an embodiment where the generator means 15 and motor 13 are mounted coaxially onto axles 12. FIGS. 5 and 6 show embodiments where four independent axles 12 are provided. FIG. 5 shows the use of two generator means 15 mounted onto the two front independent axles 12 and two motors 13 mounted onto the two rear independent axles 12. FIG. 6 shows each independent axle 12, front and rear, having a combined motor 13 and generating means 15.

It is understood that equivalents and substitutions of components and elements may be obvious to those skilled in the art, and the true scope and definition of the invention therefore is to be as set forth in the following claims.

I claim:

1. An electrically powered vehicle comprising two axles connected to wheels, an electric motor coupled to one said axle to drive said vehicle, generator means coupled to the other said axle whereby the rotation of said axle powers said generator means to create electricity, rechargeable batteries to supply electricity to said motor, electrical conducting means connecting said motor, said generator means and said batteries, and management control means to selectively deliver electricity from said batteries to said motor or from said generator means to either said motor or to said batteries for recharge.

2. The vehicle of claim 1, further comprising transmission gearing means coupled between said axle and said generator means whereby the rotation speed of said generator means may be increased to greater speed than the rotation speed of said axle.

3. An electrically powered vehicle comprising a plural number of rotating axles connected to wheels, at least one electric motor connected to at least one said axle to drive said vehicle, at least one generator means coupled to at least one said axle whereby the rotation of at least one said axle powers said at least one generator means to create electricity, rechargeable batteries to supply electricity to said at least one motor, electrical conducting means connecting said at least one motor, said at least one generator and said batteries, transmission gearing means coupled to said at least one generator means to increase the rotation speed of said at least one generator means to a speed greater than the speed of said at least one axle, and management control means to selectively deliver electricity from said batteries to said motor or from said generator means to either said motor or to said batteries for recharge.

4. The vehicle of claim 3, comprising four said motors and one said generator means.

5. The vehicle of claim 3, comprising four said generator means and one said motor.

6. The vehicle of claim 3, where said generator means and said motor are connected coaxially to said axles.

7. The vehicle of claim 3, comprising four independent axles, two generator means and two motors.

8. The vehicle of claim 3, comprising four independent axles, four generator means and four motors.

* * * * *